(12) United States Patent
Zhu et al.

(10) Patent No.: US 10,295,752 B2
(45) Date of Patent: May 21, 2019

(54) LC ADAPTER PROVIDED WITH BUILT-IN LIGHT SHIELDING PLATE

(71) Applicant: SUNCALL TECHNOLOGIES (SZ) CO., LTD., Shenzhen (CN)

(72) Inventors: Lei Zhu, Shenzhen (CN); William Bailey, Greer, SC (US); Hongbin Song, Shenzhen (CN)

(73) Assignee: Suncall Technologies (SZ) Co., Ltd., Shenzhen (CN)

( * ) Notice: Subject to any disclaimer, the term of this patent is extended or adjusted under 35 U.S.C. 154(b) by 0 days.

(21) Appl. No.: 15/735,484

(22) PCT Filed: Jun. 17, 2015

(86) PCT No.: PCT/CN2015/081613
§ 371 (c)(1),
(2) Date: Dec. 11, 2017

(87) PCT Pub. No.: WO2016/201630
PCT Pub. Date: Dec. 22, 2016

(65) Prior Publication Data
US 2018/0180819 A1    Jun. 28, 2018

(51) Int. Cl.
*G02B 6/38* (2006.01)
(52) U.S. Cl.
CPC ............ *G02B 6/3821* (2013.01); *G02B 6/38* (2013.01); *G02B 6/3825* (2013.01); *G02B 6/3869* (2013.01)

(58) Field of Classification Search
CPC .. G02B 6/3821; G02B 6/3825; G02B 6/3869; G02B 2006/4297; G02B 6/3893
See application file for complete search history.

(56) References Cited

U.S. PATENT DOCUMENTS 6,240,229 B1    5/2001  Roth
2001/0048790 A1*  12/2001  Burkholder .......... G02B 6/3825
                                                        385/78

FOREIGN PATENT DOCUMENTS

| CN | 202 837 597 | 3/2013 |
| CN | 103 543 500 | 1/2014 |
| CN | 203 673 109 | 6/2014 |
| CN | 204 758 872 | 11/2015 |

* cited by examiner

*Primary Examiner* — John Bedtelyon
(74) *Attorney, Agent, or Firm* — Fay Kaplun & Marcin, LLP

(57) ABSTRACT

An LC adapter provided with a built-in light shielding plate includes a frame. One end of the frame is provided with interfaces for matching with connection members. An upper light shielding plate and a lower light shielding plate in a spliced connection with each other are disposed at a position within the frame close to the interfaces. Both the upper light shielding plate and the lower light shielding plate are hingedly connected to the frame through a return spring. When a connection member is inserted into an interface, the upper light shielding plate and the lower light shielding plate rotate relative to the frame and are separated from each other. When the connection member is unplugged from the interface, the upper light shielding plate and the lower light shielding plate are restored to the state of the spliced connection with each other.

9 Claims, 4 Drawing Sheets

LC ADAPTER PROVIDED WITH BUILT-IN LIGHT SHIELDING PLATE

TECHNICAL FIELD

The present disclosure relates to the technical field of optical fiber connection, and in particular relates to an LC adapter provided with a built-in light shielding plate.

BACKGROUND

An optical fiber adapter, namely, an optical fiber adapter which may be on both ends thereof inserted with different types of connectors, is widely applied in optical fiber distribution frames, optical fiber communication devices, instruments, etc. The LC adapter is a kind of optical fiber adapter, and is made by using a modular jack-latch mechanism which is easy for operation. Most of LC adapters in the existing art have no function of a light shielding plate, and the cavities thereof are vulnerable to dust and debris. Moreover, the light emitted from an uncovered connector irritates human eyes. Thus, maintenance personnel need to use dust-proof hats to shield the light. The existing art also discloses an LC adapter provided with a light shielding plate. However, such an LC adapter is inconvenient for operation, and the light shielding plate thereof cannot completely fit with the adapter frame, and thus the LC adapter has the defects such as light leakage, incapability of blocking dust, etc.

SUMMARY

The object of the present disclosure lies in providing an LC adapter provided with a built-in light shielding plate. The LC adapter is simple in structure and easy for operation, can effectively prevent dust from entering, and accordingly has a light shielding effect.

To this end, the present disclosure takes the following technical solution: An LC adapter provided with a built-in light shielding plate includes a frame. One end of the frame is provided with a plurality of interfaces for matching with connection members. Upper light shielding plates and respective lower light shielding plates in a spliced connection with each other are disposed at a position with the frame close to the interfaces. An upper light shielding plate and a respective lower light shielding plate are hingedly connected to the frame through a return spring. When a connection member is inserted into an interface, the upper light shielding plate and the lower light shielding plate rotate relative to the frame and are separated from each other under the acting force of the connection member, and when the connection member is unplugged from the interface, the upper light shielding plate and the lower light shielding plate are restored to the state of the spliced connection with each other under the acting force of the return spring.

the upper light shielding plate includes a body which is in a spliced connection with the lower light shielding plate, and a extension part for being against the connection member is provided at a side of the body close to the interface. A reinforcing rib is provided between the extension part and the body. Rounded angles are provided at positions where the body, the extension part are against the connection member.

The lower light shielding plate is provided with an opening at the position where the upper light shielding plate and the lower light shielding plate are in a spliced connection with each other.

The upper portion of the frame is provided with an upper mounting groove, an upper spindle is provided within the upper mounting groove, and a plurality of the upper light shielding plates are provided on the upper spindle. The lower portion of the frame is provided with a lower mounting groove, a lower spindle is provided within the lower mounting groove, and a plurality of the lower light shielding plates are provided on the lower spindle. The number of the upper light shielding plates and that of the lower light shielding plates are the same as that of the interfaces.

The frame is provided along an up-down lower direction thereof with a plurality of mounting holes for mounting upper light shielding plates and lower light shielding plates, an outer frame for covering the mounting holes is provided outside the frame, and the outer frame is clamped with the frame.

The outer frame is provided with a split inward concave clamping piece, and the frame is provided with a clamping slot matched with the inward concave clamping piece.

Another end of the frame is provided with an elastic piece sleeved outside the frame.

The elastic piece is a U-shaped structure, and includes two elastic connections matched with the upper and lower ends of the frame, and a connection member for connecting the two elastic connections. The outer surface of the frame is provided with a U-shaped groove matched with the elastic piece. The connection part is a panel, and the thickness of the panel is smaller than the depth of the U-shaped groove.

Each of the elastic connections is provided with an upturned curled-up clamping piece, a sunken head end and a upturned head end.

Each of the upper light shielding plate and the lower light shielding plate is a plastic light shielding plate.

The beneficial effects of the present disclosure are as follows: An LC adapter provided with a built-in light shielding plate includes a frame. One end of the frame is provided with a plurality of interfaces for cooperating with connection members. Upper Light shielding plates and respective lower light shielding plates in a spliced connection with each other are disposed at a position of the frame close to the interfaces. An upper light shielding plate and a respective lower light shielding plate are hingedly connected to the frame through a return spring. When the connection member is inserted into the interface, the upper light shielding plate and the lower light shielding plate rotate relative to the frame and are separated from each other under the acting force of the connection member, and when the connection member is unplugged from the interface, the upper light shielding plate and the lower light shielding plate are restored to the state of the spliced connection with each other under the acting force of the return spring. The upper light shielding plate and the lower light shielding plate being in a spliced connection with each other can effectively prevent the dust from entering, and has a light shielding effect, and the structure thereof is simple and convenient for operations. The structure in the present disclosure is simple and convenient for operation, can effectively block the dust and debris, and has a light shielding effect.

Reference signs are as follows:
1—frame; 11—interface; 12—upper mounting groove; 13—lower mounting groove; 14—mounting hole; 15—U-shaped groove; 16—clamping slot; 2—upper light shielding plate; 21—body; 22—extension part; 23—reinforcing rib; 3—lower light shielding plate; 31—opening; 4—return spring; 5—upper spindle; 6—lower spindle; 7—outer frame; 71—concave clamping piece; 8—elastic piece; 81—elastic connection; 811—upturned piece; 812—downturned head end; 813—upturned head end; 82—connection part.

DETAILED DESCRIPTION

In combination with FIG. 1 to FIG. 6, the technical solution of the present disclosure is further described as follows by means of specific embodiments.

Figure 1:
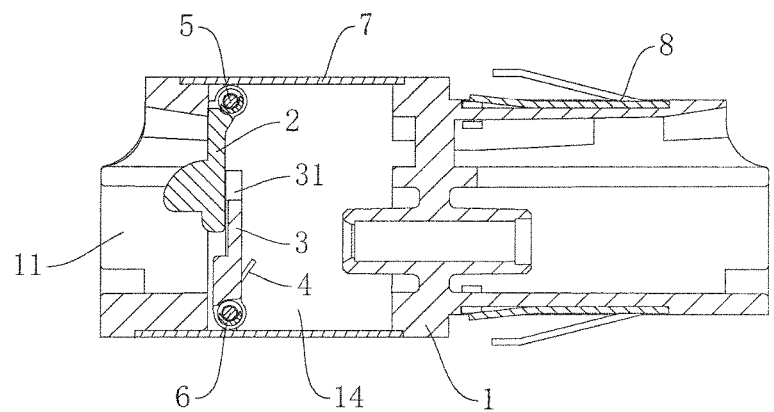
FIG. 1 is a structure schematic view of the LC adapter in the present disclosure.

FIG. 1 is a structure schematic view showing the LC adapter provided with a built-in light shielding plate in the present disclosure. The up-down direction in FIG. 1 is the up-down direction of frame 1, the left-right direction in FIG. 1 is the front-back direction of frame 1, and the front-back direction (vertical to the direction of the paper surface) in FIG. 1 is the left-right direction of frame 1.

An LC adapter provided with a built-in light shielding plate includes a frame 1. One end of the frame 1 is provided with a plurality of interfaces 11 for matching with connection members. An upper light shielding plate 2 and a lower light shielding plate 3 in a spliced connection with each other are disposed at a position within the frame 1 close to an interface 11. The upper light shielding plate 2 and the lower light shielding plate 3 are both hingedly connected to the frame 1 through a return spring 4. When a connection member is inserted into the interface 11, the upper light shielding plate 2 and the lower light shielding plate 3 rotate relative to the frame 1 and are separated from each other under the acting force of the connection member. When the connection member is unplugged from the interface 11, the upper light shielding plate 2 and the lower light shielding plate 3 are restored to the state of the spliced connection with each other under the acting force of the return spring 4. The upper light shielding plate 2 and the lower light shielding plate 3 being in a spliced connection with each other can effectively prevent the dust from entering and function as light shielding, and the structure thereof is simple, and convenient for operation. The structure in the present disclosure is simple and convenient for operation, can effectively prevent the dust from entering, and functions as light shielding.

In the present embodiment, each of the upper light shielding plate 2 and the lower light shielding plate 3 is plastic light shielding plate. The upper light shielding plate 2 includes a body 21 in a spliced connection with the lower light shielding plate 3. An extension part 22 for being against a connection member is provided at a side of the body 21 close to the interface 11. When the connection member is inserted, the extension 22 is first against the connection member, thereby reducing the acting force of the body 21 on the connection member, and improving the service life of the upper light shielding plate 2. The protrusion 22 and the body 21 are provided therebetween with a reinforcing rib 23 which effectively improves the intensity of the upper light shielding plate 2. The positions where the body 21 and the extension part 22 are against the connection member are provided with rounded angles which have a protective effect to the connection member.

In the present embodiment, lower light shielding plate 3 is proved with an opening at the position where the lower light shielding plate 3 is in a spliced connection with the upper light shielding plate 2. When a connection member is inserted, the upper light shielding plate 2 and the lower light shielding plate 3 rotate relative to the frame 1 and are separated from each other under the acting force of the connection member. The lower light shielding plate 3 is provided with the opening 31 which avoids the intervention of the connection member and the lower light shielding plate 3, such that the connection member is inserted more smoothly.

Figure 2:
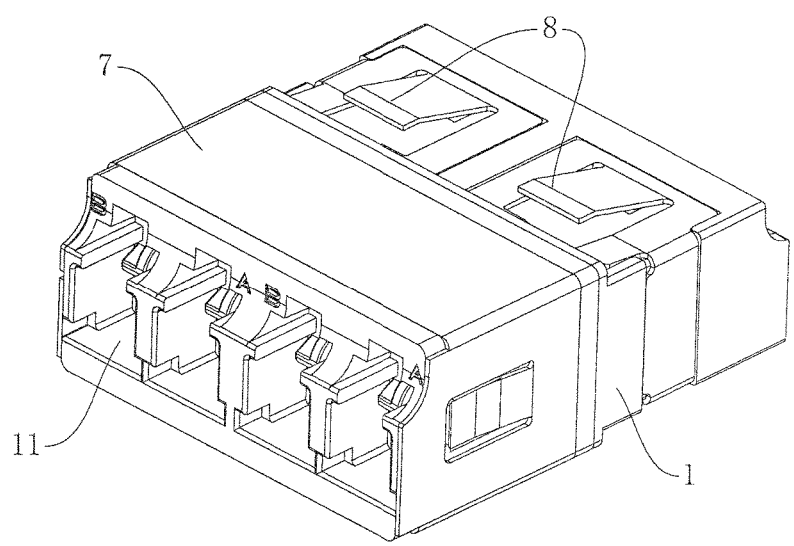
FIG. 2 is a stereo structure schematic view of the LC adapter in the present disclosure (four interfaces).
Figure 3:
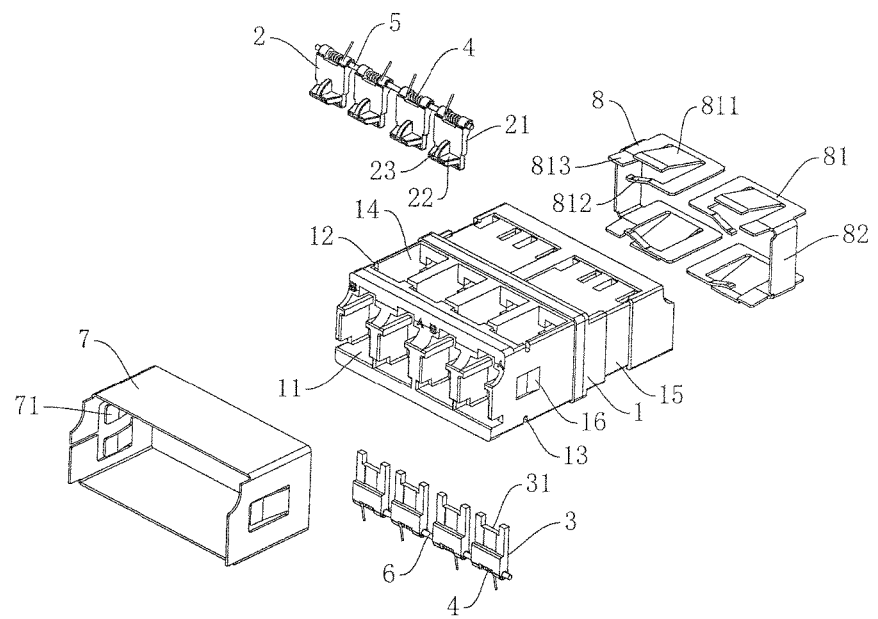
FIG. 3 is a stereo exploded schematic view of the LC adapter in the present disclosure (four interfaces).
Figure 4:
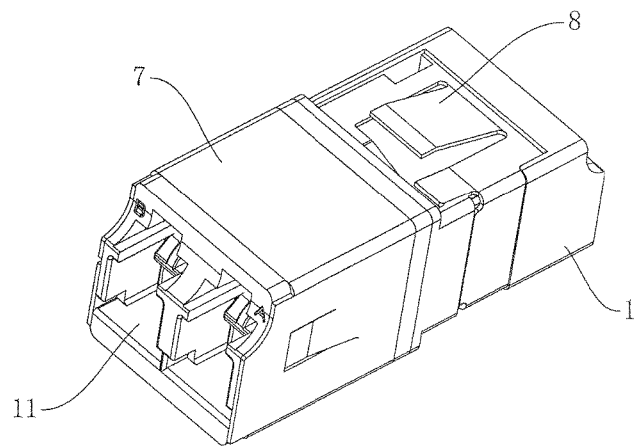
FIG. 4 is a stereo structure schematic view of the LC adapter in the present disclosure (two interfaces).
Figure 5:
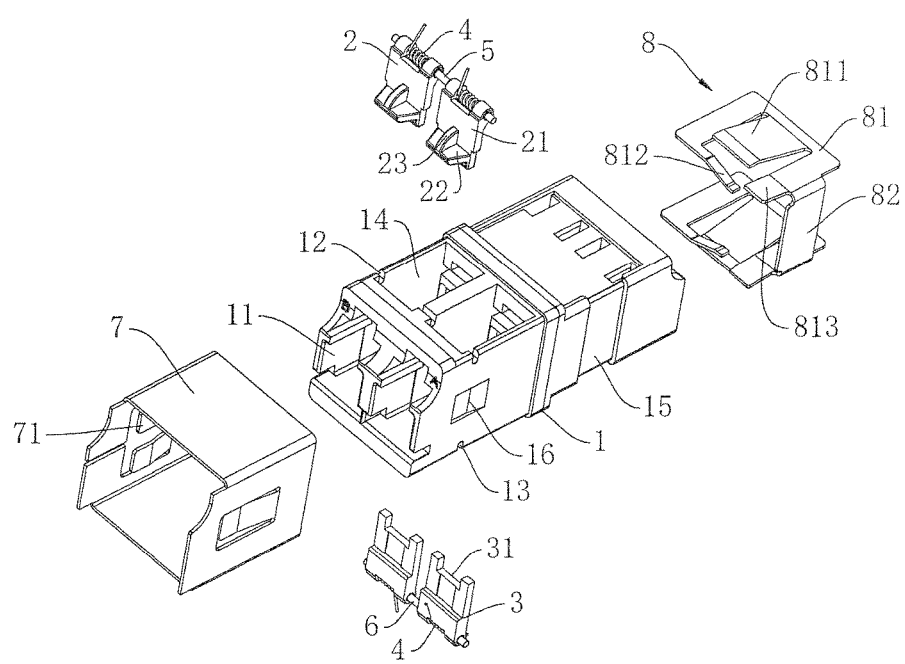
FIG. 5 is a stereo exploded schematic view of the LC adapter in the present disclosure (two interfaces).

In the present disclosure, the upper portion of frame 1 is provided with an upper mounting groove 12, an upper spindle 5 is provided within the mounting groove 12, and a plurality of upper light shielding plates 2 are provided on the upper spindle 5. The lower portion of the frame 1 is provided with a lower mounting groove 13, a lower spindle 6 is provided within the mounting groove 13, and a plurality of lower light shielding plates 3. The number of the upper light shielding plates 2 and that of the lower light shielding plates 3 are same as that the number of the interfaces 11. As shown in FIG. 2 and FIG. 3, the number of the upper light shielding plates 2, that of the lower light shielding plates 3, and that of the interfaces 11 are 4. As shown in FIG. 4 and FIG. 5, the number of the upper light shielding plates 2, that of the lower light shielding plates 3, and that of the interfaces 11 are 2. In other embodiments, the number of the upper light shielding plates 2, that of the lower light shielding plates 3, and that of the interfaces 11 may be set in light of needs.

In the embodiment, the frame 1 is provided along the up-down direction thereof with a plurality of mounting holes 14 for mounting the upper light shielding plates 2 and the lower light shielding plates 3. The mounting holes 14 are through holes provided along the up-down direction of the frame 1. An upper light shielding plate 2 and a respective lower light shielding plate 3 are mounted into the frame 1 from the upper side and lower side of a respective mounting hole 14. An outer frame 7 for covering the mounting holes 14 is provided outside the frame 1. The outer frame 7 is clamped with the frame 1. The frame 7 has a shielding effect to the upper light shielding plate 2 and the lower light shielding plate 3, and can limit a return spring 4.

In the present embodiment, the outer frame 7 is provided with a split inward concave clamping piece 71, and the frame 1 is provided with a clamping slot 16 matched with the inward concave clamping piece 71. The inward concave clamping piece 71 is matched with the clamping slot 16 such that the matching of the outer frame 7 with the frame 1 is more reliable, and the outer frame 7 can be effectively prevented from opening.

In the present embodiment, another end of frame 1 is provided with an elastic piece 8 sleeved outside the frame 1. The elastic piece 8 is in a U-shaped structure, and includes two elastic connections 81 matched with the upper and lower ends of the frame 1, and a connection part 82 for connecting the two elastic connections 81. The connection part 82 is matched with a side of the frame 1, i.e. the two elastic connections 81 of the elastic piece 8 are provided along the up-down direction of the frame 1, such that a plurality of adapters can be assembled together along the left-right direction of the adapters. When there are a small number of interfaces 11, one elastic piece 8 may be provided at the left side or right side of the frame 1 as shown in FIG. 4 and FIG. 5; when there are a great number of interfaces 11, two elastic pieces 8 may be provided respectively on the left side and the right side of the frame 1 as shown in FIG. 2 and FIG. 3.

In the present embodiment, the outer surface of the frame 1 is provided with a U-shaped groove 15 matched with the elastic piece 8. The connection part 82 is a panel, the thickness of which is smaller than the depth of the U-shaped groove 15. That is to say, the connection part 82 of the elastic piece 8 is completely located inside the U-shaped groove 15. When a plurality of adapters are assembled together along the left-right direction of the adapters, the fitting therebetween is tighter.

In the present embodiment, an elastic connection 81 is provided with an upturned clamping piece 811, a sunken head end 812 and an upturned head end 813. The upturned clamping piece 811 has a blocking effect, and the sunken head end 812 and the upturned head end 813 have a tensioning effect along the up-down direction, such that the elastic piece can be effectively embedded on the frame, and it is convenient to assemble.

Figure 6:
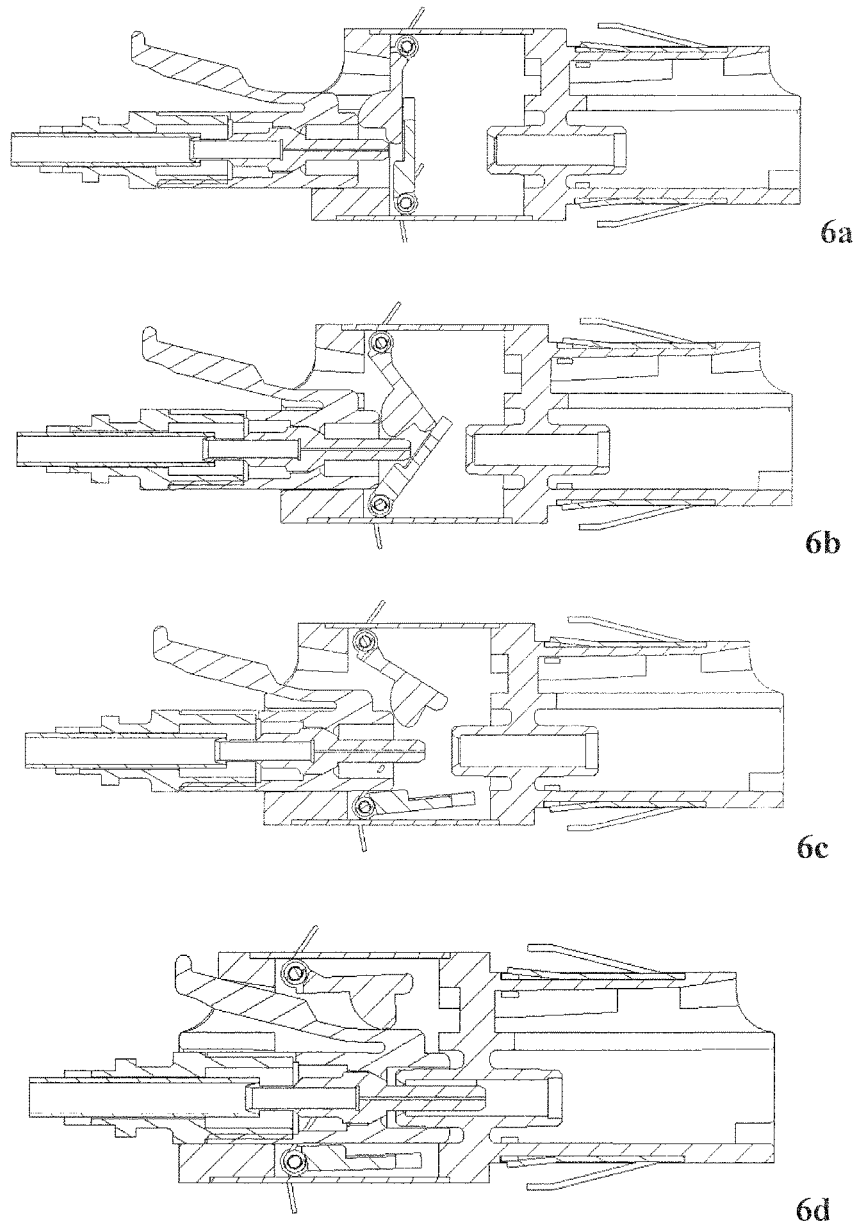
FIG. 6 is a schematic view showing the mounting of the LC adapter and connection members in the present disclosure.

The mounting process of the LC adapter and the connection members in the present disclosure are shown in FIG. 6. When a connection member is inserted, the extension part 22 of the upper light shielding plate 2 is first against the connection member as shown in 6a in FIG. 6; when a connection member is continuously inserted, the upper light shielding plate 2 and the lower light shielding plate 3 rotate relative to the frame 1 and are separated from each other under the acting force of the connection member, as shown in 6b and 6c in FIG. 6; when a connection member is completely inserted, the upper light shielding plate 2 and the lower light shielding plate 3 are respectively located on the upper and lower sides of the connection member, as shown in 6d in FIG. 6; when a connection member is unplugged, the upper light shielding plate 2 and the lower light shielding plate 3 are restored to the state of the spliced connection with each other under the acting force of the return spring 4.

The above contents are merely preferred embodiments of the present disclosure. According to the idea of the present disclosure, the person ordinarily skilled in the art would make modifications on the specific embodiments and applicable scope. The contents of the specification should not be understood as limitation to the present disclosure.

What is claimed is:

1. An LC adapter provided with a built-in light shielding plate, comprising a frame, wherein one end of the frame is provided with a plurality of interfaces for matching with connection members, an upper light shielding plate and a lower light shielding plate in a spliced connection with each other are disposed at a position within the frame close to an interface, and both the upper light shielding plate and the lower light shielding plate are hingedly connected to the frame through a return spring; when a connection member is inserted into the interface, the upper light shielding plate and the lower light shielding plate rotate relative to the frame and are separated from each other under the acting force of the connection member, and when the connection member is unplugged from the interface, the upper light shielding plate and the lower light shielding plate are restored to the state of the spliced connection with each other under the acting force of the return spring to completely close the interface,
wherein the upper light shielding plate comprises a body which is in a spliced connection with the lower light shielding plate, an extension part for being against the connection member and protecting the upper light shielding is provided at a side of the body close to the interface, a reinforcing rib is provided between the extension part and the body, and rounded angles are provided at positions where the body and the extension part are against the connection member.

2. The LC adapter according to claim 1, wherein the lower light shielding plate is provided with an opening at a position where the lower light shielding plate and the upper light shielding plate are in a spliced connection with each other.

3. The LC adapter according to claim 1, wherein the upper portion of the frame is provided with an upper mounting groove, an upper spindle is provided within the upper mounting groove, and a plurality of upper light shielding plates are provided on the upper spindle; the lower portion of the frame is provided with a lower mounting groove, a lower spindle is provided within the lower mounting groove, and a plurality of lower light shielding plates are provided on the lower spindle; and both the number of the upper light shielding plates and that of the lower light shielding plates are same as the number of the interfaces.

4. The LC adapter according to claim 1, wherein the frame is provided along an up-down direction thereof with a plurality of mounting holes for mounting the upper light shielding plate and the lower light shielding plate, an outer frame for covering the mounting holes is provided outside the frame, and the outer frame is clamped with the frame.

5. The LC adapter according to claim 4, wherein the outer frame is provided with a split inward concave clamping piece, and the frame is provided with a clamping slot matched with the inward concave clamping piece.

6. The LC adapter according to claim 1, wherein another end of the frame is provided with an elastic piece sleeved outside the frame.

7. The LC adapter according to claim 6, wherein the elastic piece is a U-shaped structure, and comprises two elastic connections matched with the upper and lower ends of the frame, and a connection part for connecting the two elastic connections, an outer surface of the frame is provided with a U-shaped groove matched with the elastic piece, the connection part is a panel, and the thickness of the panel is smaller than the depth of the U-shaped groove.

8. The LC adapter according to claim 7, wherein each of the elastic connections is provided with an upturned clamping piece, a sunken head end and an upturned head end.

9. The LC adapter according to claim 1, wherein each of the upper light shielding plates and the lower light shielding plates is a plastic light shielding plate.

* * * * *